United States Patent
Opderbecke et al.

(10) Patent No.: US 10,193,407 B2
(45) Date of Patent: Jan. 29, 2019

(54) METHOD FOR REPAIRING A ROTOR

(71) Applicant: ALSTOM Technology Ltd, Baden (CH)

(72) Inventors: Thomas Opderbecke, Untersiggenthal (CH); Kornelia Weidemann, Bad Säckingen (CH); Simon Baldasera, Newcastle (GB); Sanjiv Kumar Mishra, Neuenhof (CH); Simon Malcolm Potter, Stafford (GB); Markus Noe, Blumberg (DE)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 691 days.

(21) Appl. No.: 14/491,279

(22) Filed: Sep. 19, 2014

(65) Prior Publication Data
US 2015/0001982 A1    Jan. 1, 2015

Related U.S. Application Data

(63) Continuation of application No. PCT/EP2013/055904, filed on Mar. 21, 2013.

(30) Foreign Application Priority Data

Mar. 23, 2012  (EP) .................................... 12160951

(51) Int. Cl.
*H02K 15/02* (2006.01)
*H02K 3/51* (2006.01)
*H02K 15/00* (2006.01)
*H02K 3/38* (2006.01)

(52) U.S. Cl.
CPC ................. *H02K 3/51* (2013.01); *H02K 3/38* (2013.01); *H02K 15/0043* (2013.01);
(Continued)

(58) Field of Classification Search
CPC ............ H02K 3/51; H02K 3/38; H02K 15/02; H02K 15/0043; Y10T 29/49012; Y10T 29/49004
See application file for complete search history.

(56) References Cited

U.S. PATENT DOCUMENTS 3,745,395 A * 7/1973 Koechlin ............... H02K 3/505
                                                                310/260
6,345,433 B1   2/2002 Kliman et al.
(Continued)

FOREIGN PATENT DOCUMENTS

CN       101136562 A      3/2008
CN       101741184 A      6/2010
(Continued)

OTHER PUBLICATIONS

The European Search Report dated Sep. 10, 2012, European Patent Application 12160951.5 dated Mar. 23, 2012.
(Continued)

*Primary Examiner* — Sarang Afzali
*Assistant Examiner* — Ruth G Hidalgo-Hernandez
(74) *Attorney, Agent, or Firm* — GE Global Patent Operation; Rita D. Vacca

(57) ABSTRACT

A rotor has a rotor core with protruding fingers defining slots for conductors and support blocks at the axial ends of the fingers fixed by screws. The fingers have holes for housing the screws. The method for repairing the rotor includes removing the screws and support blocks, drilling the holes to increase the diameter thereof, providing plugs into the holes.

14 Claims, 5 Drawing Sheets

(52) U.S. Cl.
CPC ........ *H02K 15/02* (2013.01); *Y10T 29/49004* (2015.01); *Y10T 29/49012* (2015.01)

(56) References Cited

U.S. PATENT DOCUMENTS

| | | | |
|---|---|---|---|
| 7,866,020 B2 | 1/2011 | Matsuyama et al. | |
| 8,091,229 B2* | 1/2012 | Deak | F03D 1/06 264/36.1 |
| 2005/0274009 A1* | 12/2005 | Powers | B23K 1/0018 29/889.1 |
| 2007/0077133 A1* | 4/2007 | Wesolowska | E04F 19/06 411/508 |
| 2011/0176921 A1* | 7/2011 | Gignoux | B23P 6/005 416/204 A |

FOREIGN PATENT DOCUMENTS

| | | |
|---|---|---|
| FR | 2109350 A5 | 5/1972 |
| SU | 1070656 A1 | 1/1984 |

OTHER PUBLICATIONS

Database WPI, Week 200834, Thomson Scientific, London, GB, AN 2008-E88121, XP002683109 &CN 101136562 A.
Database WPI, Week 198439, Thomson Scientific, London GB, AN 1984-242588, XP002683110 & SU1070656 A3.
Unofficial English translation of Office Action issued in connection with corresponding CN Application No. 201380016003.8 dated Apr. 6, 2016.

\* cited by examiner

METHOD FOR REPAIRING A ROTOR

CROSS-REFERENCE TO RELATED APPLICATIONS

This application claims priority to PCT/EP2013/055904 filed Mar. 21, 2013, which claims priority to European application 12160951.5 filed Mar. 23, 2012, both of which are hereby incorporated in their entireties.

TECHNICAL FIELD

The present disclosure relates to a method for repairing a rotor. The rotor is a rotor of a rotating electric machine, such as for example a synchronous generator to be connected to a gas or steam turbine (turbogenerator) or a synchronous generator to be connected to a hydro turbine (hydro generator) or an asynchronous generator or a synchronous or asynchronous electric motor or also other types of electric machines.

BACKGROUND

Rotors of a rotating electric machine can have an active part with a rotor core and rotor fingers defining slots for rotor windings.

At the axial ends of the rotor fingers, supports for the rotor windings (support blocks) are provided; these supports are fixed to the rotor fingers by screws that are inserted in threaded holes of the rotor fingers. A retaining ring is connected to each end of the active part, to protect and withhold the rotor windings.

During operation, the zones of the fingers around the threaded holes can be damaged, because the material is exposed to cyclic loading and possibly fatigue due to the start up cycles.

The damage can include:
visible cracks, i.e. cracks extending over the surface of the rotor fingers,
non-visible cracks, i.e. cracks extending within the fingers but not over the surface thereof,
non-cracked fingers.

During maintenance, in case of visible or non-visible cracks, the fingers are usually repaired by removing the damaged material and replacing it by welding new material to rebuild the removed parts of the fingers.

In case of non-cracked fingers, usually no actions are carried out. Nevertheless, in some cases, even if the fingers have no cracks when the maintenance is carried out, the material thereof is already damaged (for example by fatigue), such that cracks can be formed also a short time after the maintenance.

SUMMARY

An aspect of the disclosure includes providing a method to deal with non-cracked parts of a rotor finger.

These and further aspects are attained by providing a method and a rotor in accordance with the accompanying claims.

Advantageously, according to the method the damaged (but non-cracked) material is removed, the lifetime of the rotor is increased and the cause of the damage is removed.

BRIEF DESCRIPTION OF THE DRAWINGS

Further characteristics and advantages will be more apparent from the description of a preferred but non-exclusive embodiment of the method and rotor illustrated by way of non-limiting example in the accompanying drawings, in which.

DETAILED DESCRIPTION

Figure 1:
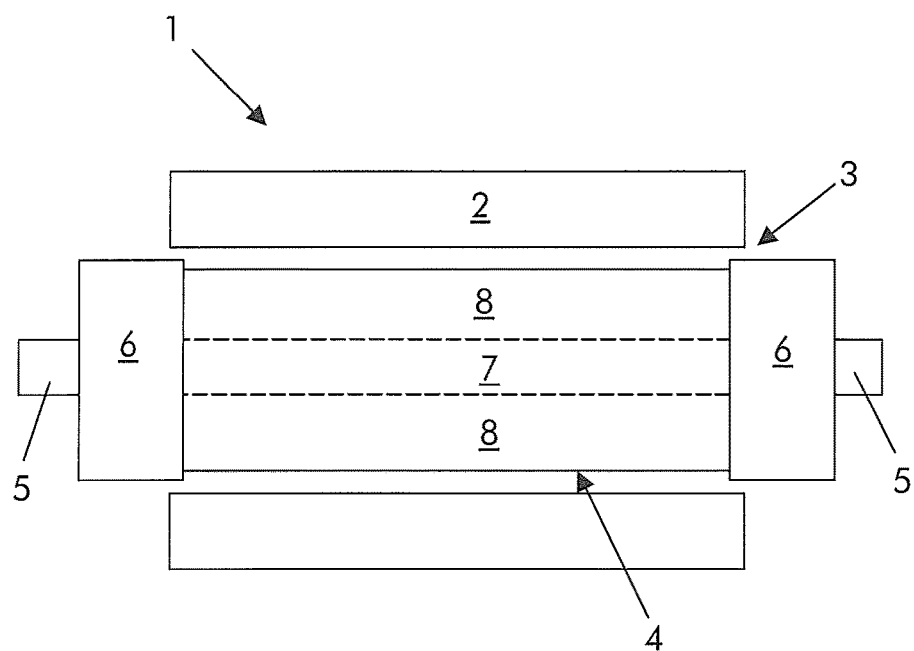
FIG. 1 is a schematic view of an electric machine.
Figure 2:
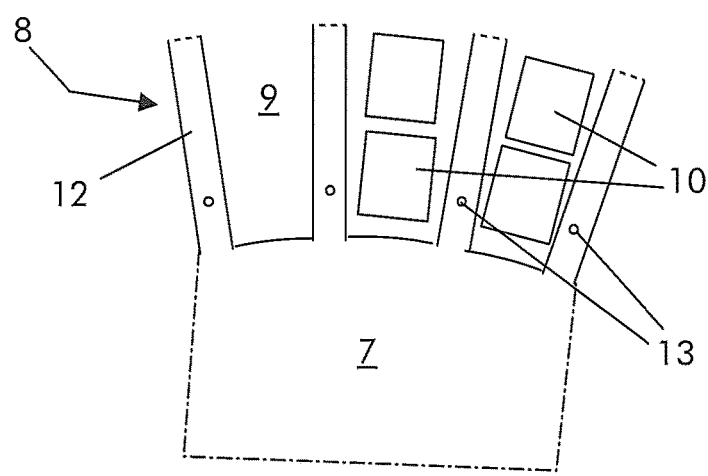
FIG. 2 is a cross section of a particular of FIG. 1.
Figure 3:
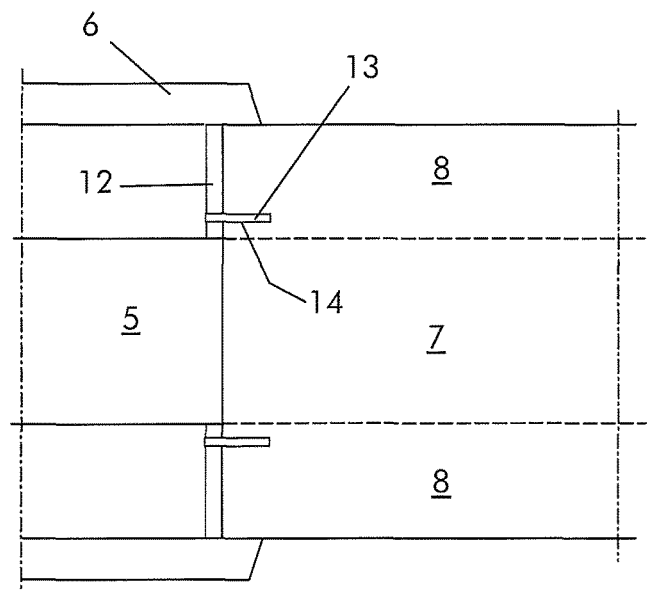
FIGS. 3 through 7 show the steps of the method.

FIG. 1 shows an electric machine such as a turbogenerator. The electric machine 1 has a stator 2 and a rotor 3. The rotor 3 has an active part 4 and shafts 5 extending from the ends thereof. Retaining rings 6 are provided at the ends or the active part 4.

The active part 4 has a rotor core 7 with protruding fingers 8 defining slots 9 for conductors 10; the conductors are connected together to define a rotor winding. In addition, portions of the conductors 10 project outside of the slots 9 and are connected together to define the rotor windings; these projecting portions are below the retaining ring 6.

Support blocks 12 for the conductors 10 (that define the windings) are provided at the axial ends of the fingers 8; these support blocks 12 are fixed by screws 13.

For this reason, the fingers 8 have threaded holes 14 that house the screws 13.

Figure 4:
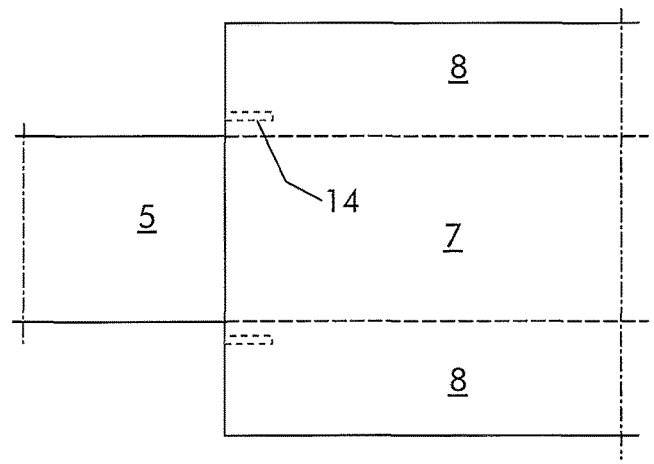

According to the method, the screws 13 and support blocks 12 are removed (FIG. 4).

Figure 5:
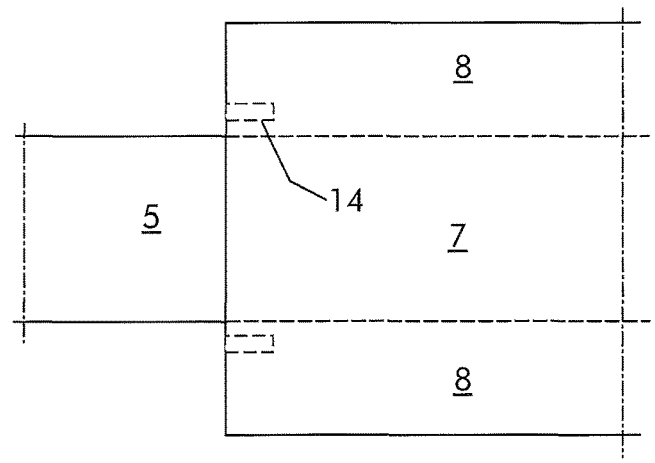

Then the holes 14 are drilled to increase the diameter thereof (FIG. 5).

Figure 6:
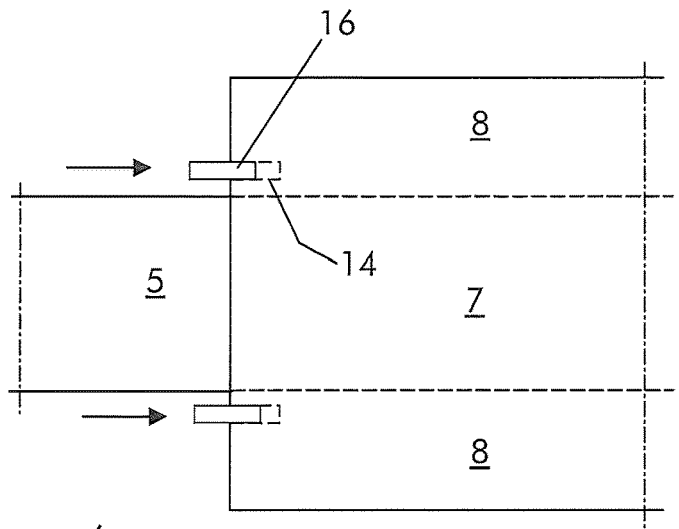

Then plugs 16 are provided into the holes 14 (FIG. 6). The plugs 16 reduce the stress around the holes 14, because the force within the fingers 8 is a compression force (caused by the retaining rings 6) and the plugs 16 undergo a substantial part of the compression force (in contrast the screws 13 do not undergo any significant compression force, because of the threaded surfaces).

Figure 7:
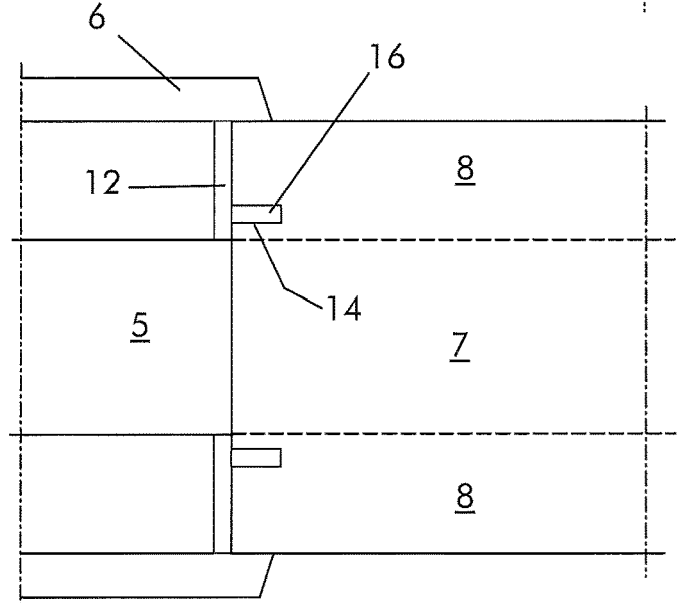
Figure 8:
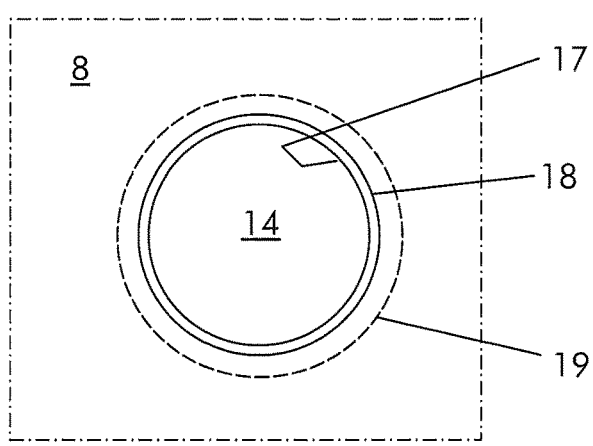
FIG. 8 shows a step of drilling and reaming.

Then the same or a different support block 12 is glued to the axial ends of the fingers 8 (FIG. 7).

Since the plug 16 are preferably only provided at the holes 14 without any cracks, before drilling of any hole 14 and insertion of any plug 16 the holes without visible (external) or non-visible (internal) cracks are detected, such that plugs 16 are only inserted into the holes 14 without visible or non-visible cracks. The other holes with visible or non visible cracks can be repaired with a traditional method, such as material removal and reconstruction of the removed parts by welding. It is anyhow clear that the present method can also be implemented for all holes (i.e. cracked and non cracked holes).

The method is preferably implemented after a given operating period or a given number of start up cycles. For example since periodical maintenance operations are carried out after given operating periods, the method can be implemented at given periodical maintenance operation. For example the method can be implemented after the first or second or also more periodical maintenance operations.

Detecting can include implementing non-destructive tests, such as ultrasound tests, liquid penetration tests, X-ray tests.

Figure 14:
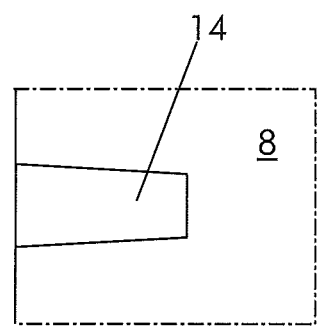
FIG. 14 shows an example of a hole.

The holes 14 have threads with an inner 17 and outer 18 diameter; drilling includes removing material outside of the outer diameter 18 of the threads, such that after drilling the hole 14 has a diameter 19 larger than the original inner and outer diameter 17, 18. The hole 14 after drilling is not threaded. For example the holes after drilling can have a cylindrical or conical shape (FIG. 14 shows a slightly conical shape of the holes).

Additionally, after drilling the holes 14 can be reamed, for example to obtain the desired tolerances, generate a round shaped hole or to mitigate notch effects.

In different examples, the plugs 16 can be provided into the holes 14 by pressing, in order to connect them in the hole with a tight fit.

Alternatively the plugs can be connected in the holes by brazing.

Figure 9:
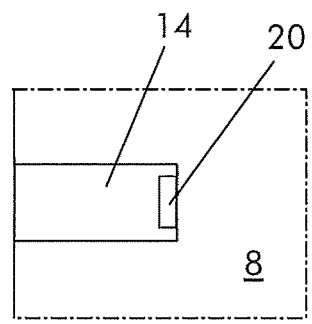
FIGS. 9 through 12 shows a steps of brazing.
Figure 10:
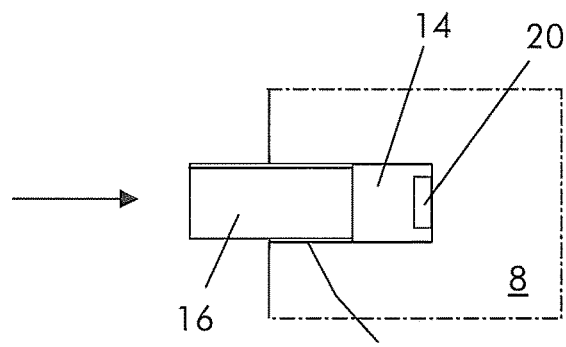
Figure 11:
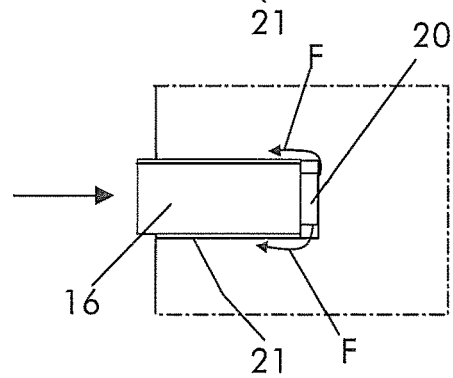
Figure 12:
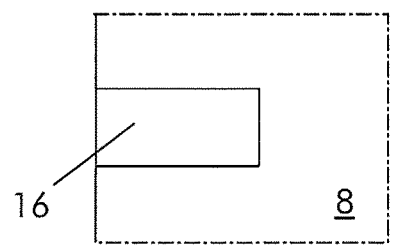
Figure 13:
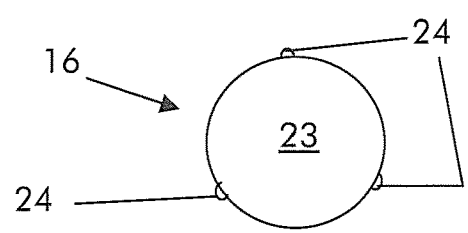
FIG. 13 shows a front view of an embodiment of a plug.

In this case brazing preferably includes inserting brazing material 20 (for example a disc of brazing material) into the hole 14 (FIG. 9), then inserting the plug 16 into the hole 14 (FIG. 10), then heating (for example by induction) and pressing the plug 16 against the brazing material 20 (FIG. 11). This causes the molten brazing material to flow F though the gap 21 between the plugs 16 and hole 14 to fill it (in addition some brazing material can also be pushed out).

In order to help introduction of the plug 16 into the hole 14 and the flow F of the molten brazing material, the plugs 16 have a core 23 with at least three protruding ribs 24; for example six protruding ribs 24 can be provided. The ribs 24 help to center the plugs 16 in the hole 14 and do not hinder plug introduction (for example by friction). The plugs 16 are preferably made out of an electric conductive and/or magnetic material.

The material of the plugs 16 preferably has an equal or lower thermal expansion coefficient than the material of the fingers 8; this can help reducing the tensile stress in operation mode. Preferably this feature is implemented in the case of a press fitted plug, but it is also possible in other cases.

In addition, the plug can be made out of a material with a higher yield strength than the rotor material; for example the chemical composition and other properties of the material of the plug can be the same as the material of the rotor, and higher yield strength can be obtained by different annealing temperature. Also this feature is preferably implemented in the case of a press fitted plug, but it is also possible in other cases.

Figure 15:
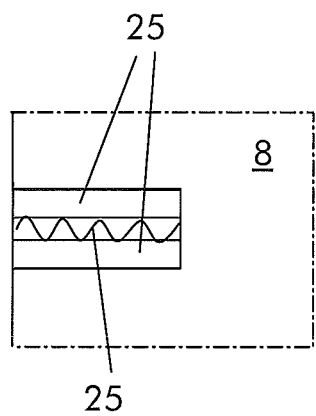
FIG. 15 shows an example of a plug.

The plugs 16 can also have a spring type structure 25 (FIG. 15); this can make the plugs 16 less sensitive to the interference fit when the plugs 16 are pressed into the holes 14. Also this feature is preferably implemented in the case of a press fitted plug, but it is also possible in other cases.

The present disclosure also refers to a rotor 3 of an electric machine.

The rotor 3 has an active part 4 and rotor shafts 5 extending from the ends of the active part 4. The active part 4 has a rotor core 7 with protruding fingers 8 defining slots 9 for conductors 10. The fingers 8 have holes 14 and support blocks 12 at their axial ends.

The rotor has plugs 16 connected in the holes 14. The support blocks 12 are connected above the plugs 16 for example by glue.

Naturally the features described may be independently provided from one another.

In practice the materials used and the dimensions can be chosen at will according to requirements and to the state of the art.

The invention claimed is:

1. A method for repairing a rotor comprising:
providing a rotor core with protruding fingers defining slots for conductors, at least one support block at each axial end of a finger of the protruding fingers fixed by a screw, and the finger having a blind hole for housing the screw;
removing the screw and the at least one support block from the axial end of the finger;
drilling the blind hole having a diameter to increase the diameter; and
inserting a plug flush into the blind hole; and
connecting the at least one support block or a different support block to the axial end of the finger above the plug inserted within the blind hole.

2. The method of claim 1, wherein the plug is connected in the blind hole by brazing.

3. The method of claim 2, wherein brazing includes:
inserting brazing material into the blind hole, then
inserting the plug into the blind hole, then
heating and pressing the plug against the brazing material.

4. The method of claim 3, further comprising heating the brazing material by induction.

5. The method of claim 4, wherein the plug has a core with protruding ribs.

6. The method of claim 1, further comprising detecting in the protruding fingers holes without visible or non-visible cracks, and inserting plugs only into the blind holes without visible or non-visible cracks.

7. The method of claim 6, wherein the detecting and the inserting are implemented after a given operating period or a given number of start-up cycles.

8. The method of claim 6, wherein the detecting includes implementing non-destructive tests.

9. The method of claim 1, further comprising gluing the at least one support block or the different support block to the axial end of the finger.

10. The method of claim 1, further comprising gluing at least one new support block, to replace the removed at least one support block, at the axial end of the finger.

11. The method of claim 1, wherein the blind hole in the finger of the protruding fingers has threads with an inner diameter and an outer diameter, wherein drilling includes removing material outside of the outer diameter of the threads.

12. The method of claim 1, wherein the plug is inserted into the blind hole by pressing.

13. The method of claim 1, wherein the plug is made out of a material having an equal or lower thermal expansion coefficient than the material of the finger.

14. The method of claim 1, wherein the plug has a spring type structure.

* * * * *